Sept. 5, 1967 R. C. WILLIAMS 3,340,357

TELEVISION VIDEO DETECTOR CIRCUIT COMPRISING
VARIABLE LOAD MEANS FOR CONTROLLING
FREQUENCY RESPONSE

Filed May 17, 1961

INVENTOR.
Robert C. Williams
BY Mueller & Aichele
Attys.

United States Patent Office 3,340,357
Patented Sept. 5, 1967

3,340,357

TELEVISION VIDEO DETECTOR CIRCUIT COMPRISING VARIABLE LOAD MEANS FOR CONTROLLING FREQUENCY RESPONSE

Robert C. Williams, Arlington Heights, Ill., assignor to Motorola, Inc., Chicago, Ill., a corporation of Illinois
Filed May 17, 1961, Ser. No. 110,720
1 Claim. (Cl. 178—7.3)

Figures 1, 2:
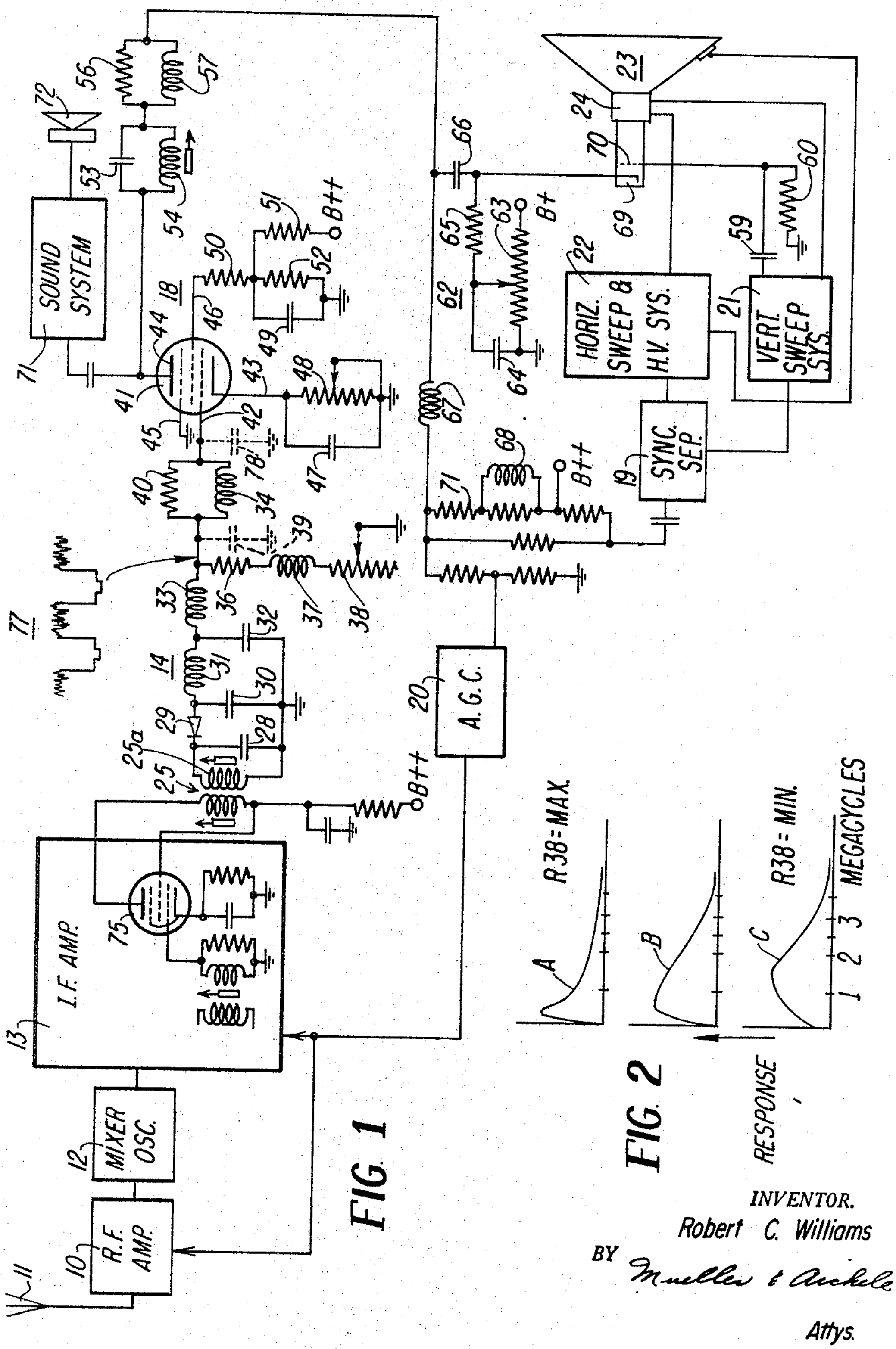

This invention relates to television receivers and more particularly to an improved circuit for adjusting the video response characteristic of a receiver according to individual preference and operating conditions.

It is common practice in television receivers to provide a means for compensating the high frequency signal components of a demodulated television signal in order to improve the response for these components and improve the quality and sharpness of detail in the picture reproduction. Such compensation is generally necessary since a television receiver operates throughout a wide range of video signal frequencies and in an uncompensated condition, the shunt capacitance of the video circuit, as well as the bandpass characteristics of the receiver, can cause a substantial attenuation of the high frequency video components. In the usual television receiver these extend as high as one to three megacycles.

The overall resultant frequency response of a receiver depends on many different factors. For example, the shunt capacity of the video circuit may vary from one production receiver to another, and the receiver bandpass, established by receiver alignment during manufacture, may vary within production tolerances among different receivers. Additionally, the actual conditions of use of the receiver may influence the high frequency response and detail of the reproduced picture. In this regard the receiver user can ordinarily adjust the fine tuner of the receiver so that a reproduced picture is in "smear" and not fully detailed because of the loss of high frequency signal components. In such condition the video carrier is positioned near the maximum response of the overall receiver frequency response and the high frequency modulation components are attenuated on a portion of reduced receiver response. Alternatively, the fine tuner can be set for maximum picture detail with the upper sideband frequencies of the signal positioned as far toward the maximum receiver frequency response as is possible without introducing the modulated sound subcarrier of the signal into the video portion of the receiver circuit which would cause reproduction of a sound pattern on the screen.

Often times the fine tuning control is not properly set and receiver users may misadjust the fine tuner or merely not readjust the fine tuner when it should be. It is recognized, of course, that some people desire a detailed picture and some may want a less detailed image as a matter of personal preference. While this can be accomplished to some extent by a fine tuning control of the receiver, many persons apparently do not appreciate the sometimes subtle changes of the picture, particularly when the fine tuning control may also change the sound reproduction, as the sound signal is moved within the receiver bandpass when the fine tuning control is adjusted.

Even beyond user preference and education, different signal conditions at the receiver may produce less than desirable results if the received signal and receiver bandpass are not properly matched to one another. That is, in the case of a weak signal the signal-to-noise ratio may be poor enough that the image is accompanied by undesirable "snow." Or, some old movies when televised may appear to include "snow." In such a situation, reduction of the receiver high frequency response could deemphasize and soften the image "snow." On the other hand, reception of a high quality television signal may preferably be reproduced in all detail with full high frequency response in the receiver. Or, it is possible that "overpeaking" might sometimes be desirable. For example, with an image lacking in detail, perhaps from an old movie, the image may be made crisp by introducing a contrasting image tone adjacent the blacks or whites of the picture.

An object of the present invention is to provide a control for the user of a television receiver to adjust the reproduced picture image from a condition of crispness and sharp detail to a condition of smoothness or softness.

Another object is to provide an easily adjustable circuit to match the receiver response to the type of a received television signal and to satisfy the picture image preference of a user of TV receivers.

A further object is to simplify and reduce the manufacturing cost of a television receiver.

Still another object is to provide a control for a television receiver to obviate the adverse effects of an undesirable frequency response characteristic such as may be caused by variation in the video channel shunt capacitance, misadjustment of the receiver fine tuner, or the like.

A feature of the invention is the provision of an improved wide range video control circuit for modifying the frequency response characteristic of a television receiver so that low video frequencies can be emphasized or high video frequencies can be emphasized to best present the television image with respect to different received signals.

Another feature is the provision of an adjustable video detector load resistor in a television receiver for variably damping a tuned circuit applying signals to the detector and thus modifying the receiver response to video signal modulation components in the detector circuit.

Still another feature is the provision of an adjustable video detector load resistor as set forth in the preceding paragraph which further may be utilized for varying a shunt peaking circuit for the demodulated video signal to supplement the effect caused by damping of the tuned circuit applying signals to the detector.

In the drawing:

FIG. 1 is a block and schematic diagram of a television receiver incorporating the invention; and FIG. 2 are frequency response curves useful in explaining the operation of the invention.

In a specific form the invention comprises a video detector for a television receiver including a double tuned intermediate frequency transformer having a secondary winding across which there is connected a rectifier diode, a video carrier filter and a detector load circuit. A video amplifier and series peaking coil are connected across the video load circuit for utilization of the demodulated signal components. The detector load circuit includes a fixed resistor, a shunt peaking inductor, and a variable resistor control. This peaking inductor, along with the resistance in the circuit and the shunt capacitance from the circuit wiring and the video amplifier input capacitance, form a network for peaking the high frequency video response. The secondary winding of the IF transformer is loaded or damped by the detector and particularly by the resistance of the load circuit. Accordingly, variation of the control resistor will change the effective impedance of the shunt peaking circuit at the same time that the IF transformer response is tilted to favor the high or low frequency modulation components of the video carrier. Tuning of the IF transformer is such that extreme values of the variable control resistor will produce respective minimum peaking and maximum peaking, (even to the point of overpeaking) by conjointly modifying the shunt peaking of the demodulated video components and modifying the IF transformer response to the video modulation signal components. The fixed resistor in the load circuit aids in circuit isolation and the variable control resistor may be on the ground side of the detector circuit so that it can be expediently connected as a customer control for adjusting the picture reproduction from the standpoint of signal conditions and personal preference, all with respect to the frequency response of the receiver.

The television receiver shown in FIG. 1 includes a radio frequency amplifier 10 of any desired number of stages. Antenna 11 is connected to its input and the mixer-oscillator 12 is connected to its output. Video IF amplifier 13 is coupled to mixer stage 12 and may also include a plurality of stages. The output of video IF amplifier 13 is coupled by means of transformer 25 to the video detector circuit 14 including the rectifier diode 29. Video detector circuit 14 serves to demodulate the video carrier of the intermediate frequency with the derived signal being applied to the video amplifier 18, and from amplifier 18 to the cathode ray picture tube 23 for reproduction of the modulation information as the television image.

Video amplifier 18 is coupled to a synchronizing signal separator 19 which separates the horizontal and vertical synchronizing pulses from the detected composite video signal in order to control the horizontal sweep system 22 and the vertical sweep system 21. The vertical sweep system is connected to deflection yoke 24 and a suitable sawtooth signal is applied thereto in order to vertically scan the beam of cathode ray tube 23 and reproduce individual picture frames. Horizontal sweep system 22 is connected to yoke 24 and this system develops suitable sawtooth scanning signals for horizontal or line scanning of the beam in tube 23 to produce the individual lines of the television picture in each frame. System 22 may also include suitable circuitry to produce the high voltage for the screen of tube 23. System 21 may further have circuitry for proper blanking action at grid 70 of tube 23. This consists of coupling capacitor 59 and a grid return resistor 60.

The receiver has an AGC system 20 to which the video amplifier 18 applies a signal directly related to the strength of the received signal. AGC system 20 produces a gain control potential for application to the RF and IF amplifier stages to reduce the gain thereof as the received signal level increases. Video amplifier 18 is also coupled to the sound system 71 of the receiver and the output terminals of the sound channel are connected to a speaker 72.

The detailed operation of the portion of the television receiver thus far described is known and understood by those skilled in the art. In essence, a signal received by antenna 11 is amplified in radio amplifier 10 and heterodyned in mixer oscillator 12 with the resulting intermediate frequency signal being amplified in video IF amplifier 13. The amplified intermediate frequency signal from amplifier 13 is then detected in video detector 14 to produce a composite video signal including components extending through a selected frequency range. The video signal is amplified in video amplifier 18 and applied to the cathode element 69 of reproducing device 23 to control the intensity of the cathode ray beam in accordance with the picture intelligence. The sound modulated subcarrier is derived in video detector 14, and this is utilized by the sound system 71 of the receiver. The synchronizing components of the television signal are separated in sync separator 19 and used to synchronize the horizontal and vertical sweep systems in a well-known manner.

Video detector 14 includes a rectifying element 29, which may be a diode, crystal or other semiconductor device. The output electrode of diode 29 is connected to the control electrode 42 of electron discharge device 41 through circuitry composed of inductance coils 31, 33 and 34 connected in series. Capacitors 30 and 32 are connected from the ends of coil 31 to ground. The capacitances referenced as 39 and 78 represent stray wiring capacitance and interelectrode or input capacitance of electron discharge device 41. The circuit formed by inductance coils 31 and 33, shunted by capacitors 30, 32, forms a filter network operating to suppress the intermediate frequency signal from video IF amplifier 13 and its harmonics.

Cathode 43 of electron discharge device 41 is connected through a variable resistance to ground for variable cathode bias and thus a contrast control by variation of video signal amplification. Capacitor 47 is a bypass for the cathode. Screen electrode 46 of pentode amplifier device 41 is connected to the positive terminal $B^{++}$ of a source of unidirectional potential through resistors 50–51. Resistor 52 is a voltage divider with resistor 51. The screen grid is bypassed to ground through capacitor 49.

Resistor 50 is used to protect diode 29 if excessive grid current is drawn in the amplifier device 41 due to a possible short circuit between control grid 42 and screen grid 46. In such a case resistor 50 would effectively limit the current to a safe value to prevent breakdown of the diode 29.

Suppressor electrode 45 of device 41 is connected to ground and the anode 44 of the device is coupled to the cathode electrode 69 of image reproducing device 23 through networks 53, 54 and 56, 57 and coupling capacitor 66. The network consisting of coil 54 and capacitor 53 connected to parallel has values to introduce an anti-resonant point at the frequency of the intercarrier sound component which, by present day standards, is 4.5 megacycles. Network 56, 57 consists of a peaking coil 57 shunted by resistor 56. $B^{++}$ is applied to anode 44 through inductance coils 54 and 57, peaking coil 67, resistor 71, and damped peaking coil 68. Network 62 controls the cathode bias of tube 23 and therefore image brightness. This consists of potentiometer 63 in series with resistor 65 and bypassed by capacitor 64.

The output of the video detector 14 is a composite video signal 77 developed across the detector load impedance comprising series connected resistor 36, shunt peaking coil 37 and variable diode load resistor 38 all connected in series between the junction of coils 33, 34 and ground. The input of video amplifier 18 exhibits a declining response to the high frequency components of the demodulated video signal. This is caused by the shunt capacity 78 between grid 42 and ground and the shunt capacity 39. Capacities 78 and 39 include the effective values of the various capacitor components 30 and 32, as well as the inherent distributed capacity of the circuit consisting of inherent stray wiring capacity, tube input interelectrode capacity, and the like.

The high frequency response of the circuit is improved in two ways. The first is by the use of a shunt peaking circuit comprised of resistors 36 and 38 in series with coil 37 and shunted by the effective shunt capacities 39 and 78. This network forms a parallel resonant circuit to offset at least partially the normal declining response for the high frequency video signals.

The second means of compensating to improve the response range is by the incorporation of a series peaking coil 34 shunted by the fixed resistor 40 and cooperating with the shunt capacities 39 and 78. Capacities 39 and 78 are effectively connected in series and the combination of them is in parallel with coil 34. As is known, such a series peaking circuit is designed to resonate at a frequency such that the capacities 39 and 78, in series with one another, have a reduced signal shunting result in the overall circuit in order to more than offset the impedance introduced by the coil 34. Resistor 40, of course, is incorporated to reduce the Q of the series peaking coil 34.

With the combination series and shunt peaking it is possible to increase the value of the detector load resistance (here resistors 36, 38) in order to increase the overall signal output of the circuit, as well as to increase the high frequency response by offsetting the effective shunt capacity in the circuit.

Resistor 38 is made variable in order to vary the amount of shunt peaking. As the value of resistor 38 is increased, peaking will be minimized and high frequency response will be reduced. Conversely as the value of resistor 38 is decreased, there will be improved high frequency response and greater peaking in the circuit. It may be found preferable to have the series peaking network including coil 34 designed to peak at a somewhat higher frequency than normal since the adjustment of resistor 38 can be used to reduce the overall peaking when that is necessary.

Resistors 36 and 38 also form the primary portion of the resistance in the load for the diode detector circuit. It will be noted that resistors 36 and 37 are effectively in series with diode 29 and connected across the secondary winding 25a of the transformer 25. Transformer 25 is of the double tuned type with the primary winding tuned on one side of the center of the intermediate frequency pass band and the secondary winding 25a tuned on the other side of the center of the pass band. The primary winding of transformer 25 is connected in the anode circuit of the final intermediate frequency amplifier, or pentode vacuum tube 75.

The quality factor or Q of the tuned secondary winding 25a is dependent upon the loading resistance across it. As resistor 38 is increased in value, the Q of the tuned secondary will increase and conversely as the resistor 38 is decreased in value the Q will be decreased. It is preferable that the secondary winding 25a be tuned on the side of the intermediate frequency amplifier pass band in which the video carrier appears under normal receiver operation. In usual present day television receivers the video carrier in the intermediate frequency amplifier is established at 45.75 megacycles and the sound signal subcarrier is at 41.25 megacycles. Furthermore, the IF pass band is high between 43 and 44 megacycles and it is contemplated that the video carrier will be established along a portion of the IF response which has declined by about 6db at its frequency. A receiver normally has a sound signal trap at 41.25 megacycles for greatly attenuating the sound signal, and under these conditions the upper side band of the transmitted TV signal will be translated to best advantage through the IF amplifier.

As stated above, the secondary winding 25a is preferably tuned to the high frequency side of the center of the IF pass band and in the region of 45.75 megacycles. Therefore, when resistor 38 is increased in value the Q of winding 25a will be increased and the frequency response of the transformer 25 will be tilted to increase response in the region of the video carrier and the low frequency modulation components thereof. This will tend to emphasize the low frequency components at the same time the high frequency components are attenuated because of the previously explained operation of the shunt peaking circuit (36, 37, 38, 39 and 78).

Therefore, the increase of resistor 38 causes minimum peaking for the reason that the shunt peaking circuit is less effective and the Q of the tuned secondary winding 25a is increased to emphasize the low frequency components of the modulated video carrier.

When the value of resistor 38 is decreased, the Q of the tuned winding 25a is decreased thus tilting the frequency response of the input circuit to the detector in a direction to reduce the response to the low frequency modulation components at the same time the peaking effectiveness of the shunt peaking circuit is increased to maximize the high frequency response of the circuit to the detected video frequency components.

The effect on the frequency response of the receiver for the two described actions is cumulative. However, by far the most predominant effect is due to the damping of the tuned IF transformer 25. Thus, it is possible to change the value of resistor 38 within a reasonable range from the standpoint of permitted variation in the video detector load and obtain a very pronounced and noticable change in the frequency response of the receiver. It may be appreciated that the IF amplifier tube 75 must supply a sufficient output signal in order to permit a reduced value of diode detector load while still providing a proper signal level for drive of the cathode ray tube 23.

FIG. 2 includes three different frequency response curves for the receiver of FIG. 1 as measured from the input to the mixer-oscillator stage 12 to the input of the cathode ray picture tube 23. In curve A, resistor 38 is set at a maximum value and it will be noted that there is a marked emphasis of the low frequency video signals below 1 megacycle and that the higher video frequencies above 1 megacycle are greatly attenuated.

Curve B represents a moderately peaked circuit with resistor 38 set at a mid value for the detector load and it may be noted that there is a decided increase in the high frequency response between one and two megacycles as compared to curve A. Curve C represents a frequency response for the receiver to video signals with resistor 38 set at a minimum value such that only fixed resistor 36 provides the detector load resistor. In this situation, there is depicted an overpeaking condition in which some of the low frequency signal components are actually reduced in valve and the higher video frequencies above one megacycle are greatly accentuated.

In a system of practical construction it may be desirable to select variable resistor with respect to fixed resistor 36 so that the system can be varied from marked underpeaking to marked overpeaking in order to permit a user to best appreciate the effect of the control. The taper of resistor 38 may be varied so that there is less change of resistance per degree of rotation of variable resistor 38 at the low resistance end of the control since its adjustment will have a greater effect on the receiver as its resistance moves towards minimum.

In a system of practical construction the component values were as follows:

| | |
|---|---|
| Transformer **25** | 44 megacycle double tuned video IF transformer. |
| Diode **29** | Type 1N60. |
| Capacitor **28** | 5.6 micromicrofarads. |
| Capacitor **30** | 4.7 micromicrofarads. |
| Inductor **31** | 8.5 microhenries. |
| Capacitor **32** | 10 micromicrofarads. |
| Inductor **33** | 8.5 microhenries. |
| Inductor **34** | 100 microhenries. |
| Resistor **36** | 1500 ohms. |
| Inductor **37** | 200 microhenries. |
| Variable resistor **38** | 0–7,000 ohms. |
| Distributed capacity **39** | Approximately 28 micromicrofarads. |
| Resistor **40** | 8,200 ohms. |
| Electron tube **41** | 6GK6. |
| Capacitor **78** (tube input capacitance) | Approximately 15 micromicrofarads. |
| Tube **75** | 6BL8. |

It is contemplated that the receiver will initially be adjusted and tuned with the control 38 set at about its mid-value to provide what may be termed moderate video peaking. Under these conditions the double tuning of transformer 25 is such that its response is approximately equal on both sides of the center of the IF pass band. It is also preferable that the fine tuner of the receiver, associated with the oscillator of the mixer oscillator circuit 12, be adjusted to position the incoming signal with the video carrier at approximately 45, 75 megacycles, that is, on the high frequency side of the IF pass band and at a point where the carrier is attenuated somewhat with respect to the maximum response of the IF pass band. Then subsequent variation of resistor 38 can establish an underpeaking condition for smoothing out the picture and emphasizing the low frequency components and tending to mask any noise (snow) in the picture. On the other hand, control 38 may also be adjusted to further emphasize the high frequency components of the video signal and bring out the full detail that is in the picture. In addition, the control 38 may be adjusted to its extreme peaking condition to what may be termed overpeaking. In this condition, the amplitude of the high frequency components of the video signal may be such that a slight "ringing" can occur in the video section of the receiver so that with an abrupt change from black to white or white to black in the reproduced image a contrasting image tone will appear immediately following such an abrupt image change thus lending an apparent improved contrast or sharpness to the image. This may be helpful in the case of a transmitted signal which does not contain the usual amount of high frequency video signal detail.

Control 38 is preferably available from the front panel of a television receiver to facilitate operation by a user. Wiring problems within the receiver and decoupling of video frequency signals which are translated by the interconnection of the detector stage 14 with the video amplifier stage 18 can be obviated to some degree by placing fixed resistor 36 adjacent a signal coupling path and by placing the variable resistor 38 on the ground side of peaking coil 37.

The above described circuit provides therefore, a control for the user of a television receiver to adjust the overall band pass of the receiver to meet the characteristics of the received signal in view of the particular user's preference as to the reproduced image. It is possible to compensate for some mistuning of the receiver fine tuner, for example, if the video carrier has been moved within the IF pass band to a position near the maximum response (a condition for which receivers are not normally designed) and so that the high frequency modulation components are attenuated, then adjustment of the control 38 may be made to restore some of the attenuated high frequency components to compensate for the misadjustment of the fine tuner. Similarly if, due to aging of the receiver components and variation in shunt capacity or variation in production alignment tolerances, the receiver alignment is not best adjusted for picture reproduction of the full video signal, control 38 is used to obtain compensation and an improved picture image.

What is claimed is:

A video detector circuit for a television signal having a carrier modulated with video signal components, including in combination, a source of the television signal comprising a transformer having a first resonant circuit tuned substantially below the carrier frequency and a second resonant circuit inductively coupled to said first resonant circuit and tuned in the region of the frequency of the carrier, a rectifier and detector load series connected across said second resonant circuit, said detector load including series connected fixed and variable resistors, said fixed and variable resistors having values so that the frequency response of said transformer is effectively tilted by adjustment of said variable resistor to increase or decrease response thereof to the video signal components in the region of the frequency of the carrier, and a video signal utilization circuit connected across said detector load.

References Cited

UNITED STATES PATENTS

| | | | |
|---|---|---|---|
| 2,302,520 | 11/1942 | Bingley | 178—7.3 |
| 2,514,112 | 7/1950 | Wright et al. | 178—7.5 |
| 2,627,022 | 1/1953 | Anderson | 178—7.3 X |
| 2,829,197 | 4/1958 | Scott | 178—7.3 |
| 2,927,958 | 3/1960 | Kroger | 178—7.5 |

OTHER REFERENCES

Fink: "Television Engineering Handbook," McGraw-Hill, New York, 1957, sections 11.3, 11.806, 13,301 and 16.4.

JOHN W. CALDWELL, *Acting Primary Examiner.*

DAVID G. REDINBAUGH, NEWTON N. LOVEWELL, R. LAKE, *Examiners.*

J. McHUGH, M. GINSBURG, R. L. RICHARDSON, *Assistant Examiners.*